Feb. 9, 1960 M. P. HAINES 2,924,495
INSTRUMENT CASE
Filed Sept. 15, 1958
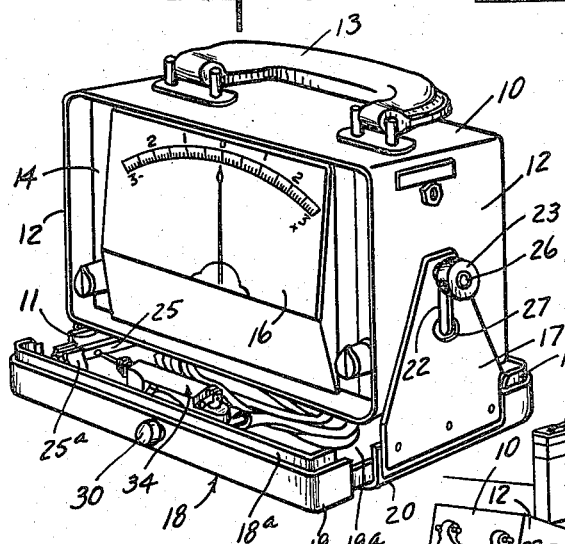
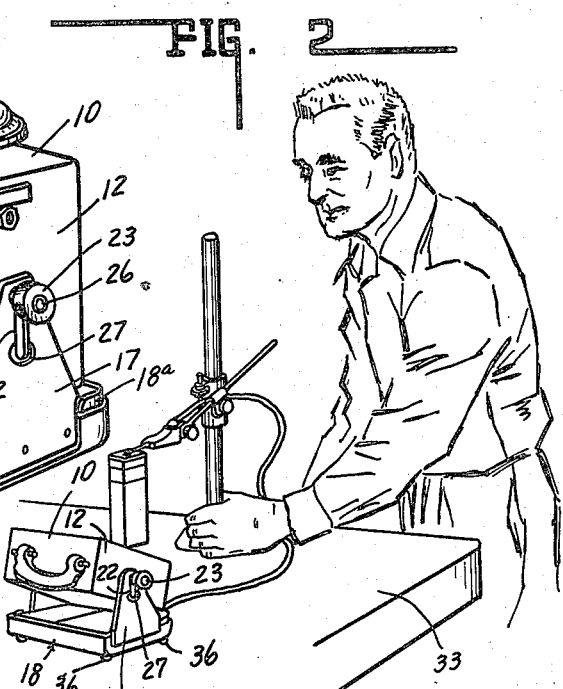
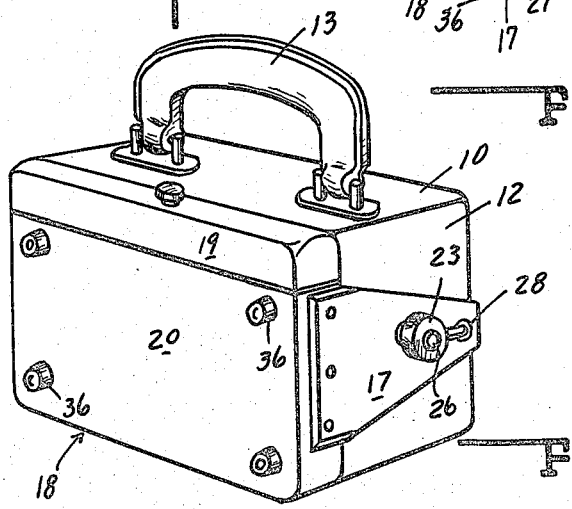
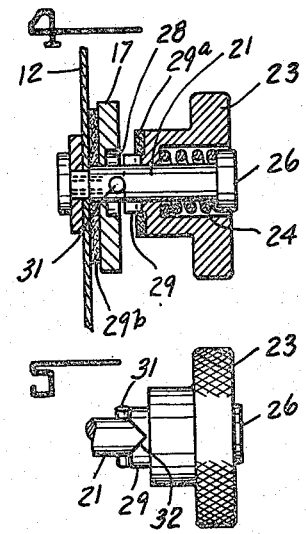
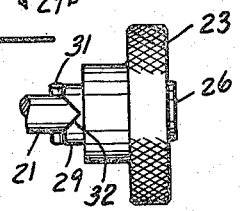
INVENTOR.
MALCOLM P. HAINES.
BY
Lockwood, Galt, Woodard & Smith.
ATTORNEYS.

2,924,495

INSTRUMENT CASE

Malcolm P. Haines, Indianapolis, Ind., assignor to Merz Engineering, Inc., Indianapolis, Ind., a corporation Application September 15, 1958, Serial No. 761,141

7 Claims. (Cl. 312—251)

This invention relates generally to instrument cases and in particular to an instrument case wherein a protective cover plate may be manipulated to provide a support base for the instrument.

Conventionally, instrument cases for ammeters, voltmeters, electronic gages and the like, are generally rectangular in configuration, the glass covered viewing face of the instrument being protected by a hinged cover plate which is dropped or removed from the instrument case when the instrument is in use. In bench work use these conventionally cased instruments are placed on the instrument bench so that their viewing face is either in a horizontal or vertical plane. Depending upon the height of the instrument user and whether he is taking readings from a sitting or stand position, the necessity of placing the instrument viewing face in either a horizontal or a vertical plane may cause the instrument face to be presented at an undesirable angle to the instrument reader. Viewing the instrument from an angle, rather than head-on, also tends to introduce parallax errors into the readings.

It is the principal object of the present invention to provide an instrument case having a cover plate which may be manipulated to provide a support base for an instrument, permitting tilting of the instrument face.

It is a further object of the present invention to provide an instrument case having its viewing face protected by a cover plate which may be moved rectilinearly and pivotally with relation to the instrument case to provide a support base for the instrument.

It is a further object of the present invention to provide an instrument case having a cover plate pivotally mounted on the case by means of a cam lock which permits convenient manipulation of the cover plate with relation to the instrument case.

It is a further object of the present invention to provide an instrument case having a cover plate which may be manipulated to provide the support base for the instrument, the cover plate having a two-piece, tray-like configuration accommodating lead wires or probes used with the instrument.

These and other objects will become apparent as the description proceeds with reference to the accompanying drawings in which:

Fig. 1 is a perspective view of an instrument embodying the present invention.

Fig. 2 is a perspective view showing the instrument of Fig. 1 in use upon an instrument bench.

Fig. 3 is a perspective view similar to Fig. 1, but showing the cover plate in place over the instrument face.

Fig. 4 is a detailed view of the mounting means for the cover plate.

Fig. 5 is a fragmentary view of the mounting means taken at 90° to the view of Fig. 4.

Referring to the drawings, there is shown an instrument case housing an instrument such as an electronic gage. The instrument case has top and bottom walls 10 and 11 and side walls 12. The top wall of the case has conventionally attached thereto a carrying handle indicated at 13.

The viewing face 14 of the instrument is inset somewhat and is conventionally provided with a transparent viewing window 16 which protects the pointer and index marking of the instrument.

The instrument case is supported by means of brackets 17 which are rigidly secured to opposite sides of a cover plate 18. The cover plate is formed by two aligned members 19 and 20 each of which has correspondingly flanged margins. The member 19 is secured to tray or plate 19a having flanged side margins and slidably nested within the member 20. A guide bar 25 secured to the member 20 extends in overlying relation to the tray and slidably accommodates a spring clip 25a, which is carried by the member 19. The margins of the cover plate formed by members 19 and 20 are provided with offset portions 18a which are adapted to fit within the inner surfaces of the walls of the case when the cover plate is moved from supporting position to a position overlying the viewing face of the instrument, as will subsequently be described. The member 19 is provided with a knob 30 by means of which the drawer formed by member 19 may be partially withdrawn from the member 20 to provide access to the lead wires, probes or the like which may be conveniently stored therein. When the guide bar 25 is received within the arms of the spring clip 25a, the arms of the clip yieldably engage the bar to frictionally resist movement of the drawer with respect to the member 20. Thus, the drawer will maintain the position at which it is placed by the operator.

The means for attaching the ends of the brackets to the side walls of the instrument case includes aligned pins 21 (only one of which is visible in the drawings) which extend from the side walls 12 of the case. The pins extend through slots 22 in the brackets and on their outer end accommodate knurled manually rotatable members 23. As may be seen in Figs. 4 and 5, the members 23 are recessed to house a spring 24 which acts between the member 23 and a spring retainer 26 carried on the pin 21.

Adjacent each of their ends the slots are provided with enlarged apertures or sockets 27 (Fig. 1) and 28 (Fig. 3) which do not extend completely through the brackets. As may be seen in Fig. 4, the apertures accommodate a reduced portion 29 of the member 23. A pin or abutment 31 extends from opposite surfaces of the pin 21 and fits within detent notches 32 (Fig. 5) formed in the margin of the reduced portion 29, the notches being urged into engagement with the abutment 31 by the spring 24. The shoulder formed by the reduced portion 29 has affixed thereto a gasket 29a which, when the detent notches are seated on abutment 31, frictionally engage the adjacent bracket 17. A friction gasket 29b is positioned between the sidewall 12 and the adjacent bracket to permit movement of the bracket with relation to the casing sidewall.

With the members 23 rotated 90° from their positions of Fig. 4, it will be evident that the detent notches will be forced against the abutment 31 and the reduced portions 29 will extend into the apertures 28, the brackets 17 thereby supporting the instrument in spaced relation above the cover plate as shown in Fig. 1.

As will be evident from Fig. 2, the instrument case may be placed upon an instrument bench, indicated fragmentarily at 33 with the cover plate 18 acting as a supporting base for the instrument. When so placed, instrument may be tilted about the support axis provided by the pins 21 so that its viewing face may be presented head-on to the instrument reader. As may be seen in Fig. 1 any probes or lead wires, indicated generally at 34, necessary in using the instrument, may be stored within the cover plate, access thereto being had by sliding the member 18 out from member 20.

When the instrument is not in use, the cover plate may be moved from its supporting position of Fig. 1 into its position of Fig. 3, wherein it overlies the viewing face of the instrument. This may be accomplished by rotating the members 23 in either direction of their position of Fig. 4. When the members 23 are so rotated, the action of the abutment 31 carried by the pin 21 against the sides of the notches 32 will cam the portions 29 out of the corresponding apertures 28. With the portions 29 removed from the apertures 28 the cover plate may be pivoted around the support axis provided by the pins 21 and then moved inwardly until the margins of the cover plate abut the edges of the top, bottom and side walls of the instrument case. During this movement the pins 21 will travel along the slots 22, and when the apertures 27 are aligned with the reduced portions 29 of the members 23, by rotating the members 23 so that notches 32 are aligned with the abutments 31 the compression springs 24 will seat the portions 29 in the apertures. The cover plate is thus locked into position overlying the viewing face of the instruments.

The outer surface of the cover plate may be provided with rubber snubbers 36 which, as will be evident from Fig. 2, prevent sliding of the instrument on the instrument bench or other supporting surface.

From the foregoing it will be evident that the instrument case embodying the present invention provides a support means for a cover plate which permits rectilinear and pivotal movement of the cover plate so that it may be utilized as both a protective cover for the instrument face and as a support surface for the instrument. With the instrument supported in spaced, overlying relation to the cover plate, its viewing face may be tilted to any desired angle by the user of the instrument. The cam lock shown in detail in Figs. 4 and 5, provides a convenient means for releasing the coupling between the instrument case and the cover plate so that the cover plate may be easily moved between its supporting and instrument face protecting positions. The two piece construction of the cover plate, providing a sliding drawer permits ready access to leads or probes or the like necessary in using the instrument.

Although various modifications may occur to others skilled in the art, the scope of the present invention is to be limited only by the appending claims.

In the appended claims the terminology "viewing face" is used to designate a face having pointers, indicia, dials or other indicators associated therewith for reading by an individual.

The invention claimed is:

1. An instrument case of generally cuboid configuration having a viewing face, a cover plate having inwardly flanged margins adapted to overlie said viewing face, said cover plate being formed of two slidably interfitting members, one of said members being adapted to be partially withdrawn from the other member, support means for said cover plate including slotted brackets extending from said cover plate into overlying relation with opposite sides of the instrument case, aligned pins extending from said opposite sides of the instrument case and through the slots in said brackets, manually operable clamping members received on said pins and cooperating with said slots to fix the position of said pins therein, whereby upon release of said clamping members said cover plate may be moved rectilinearly away from the instrument face and may be pivotally moved above the axis of said aligned pins to provide a base for said instrument case, said clamping members permitting tilting of said viewing face with relation to its support base, the inwardly flanged marginal configuration of said cover plate providing a receptacle for accommodating leads, probes, or the like, withdrawal of said one of said cover plate members from the said other cover plate member permitting convenient access to the receptacle.

2. An instrument case of generally cuboid configuration having a viewing face, a cover plate having inwardly flanged margins adapted to overlie said viewing face, support means for said cover plate including slotted brackets extending from said cover plate into overlying relation with opposite sides of the instrument case, aligned pins extending from said opposite sides of the instrument case and through the slots in said brackets, manually operable clamping members received on said pins and cooperating with said slots to fix the position of said pins therein, whereby upon release of said clamping members said cover plate may be moved rectilinearly away from the instrument face and may be pivotally moved about the axis of said aligned pins to provide a support base for said instrument case, said clamping members permitting tilting of said viewing face with relation to its support base, the inwardly flanged marginal configuration of said cover plate providing a receptacle for accommodating leads, probes, or the like.

3. An instrument case of generally rectangular configuration having a viewing face, a cover plate adapted to overlie said viewing face, support means for said cover plate including slotted brackets extending from said cover plate into overlying relation with opposite sides of the instrument case, aligned pins extending from said opposite sides of the instrument case and through the slots in said brackets, manually operable clamping members received on said pins and cooperating with said slots to fix the position of said pins therein, whereby upon release of said clamping members said cover plate may be moved rectilinearly away from the instrument face and may be pivotally moved about the axis of said aligned pins to provide a support base for said instrument case, said clamping members permitting tilting of said viewing face with relation to its support base.

4. An instrument case of generally rectangular configuration having a viewing face, a cover plate adapted to overlie said viewing face, support means for said cover plate including slotted brackets extending from said cover plate into overlying relation with opposite sides of the instrument case, aligned pins extending from said opposite sides of the instrument case and through apertures in said brackets, manually operable clamping members received on said pins and cooperating with said apertures to fix the position of said pins with relation to said brackets, whereby upon release of said clamping members said cover plate may be moved rectilinearly away from the instrument face and may be pivotally moved about the axis of said aligned pins to provide a support base for said instrument case, said clamping members permitting tilting of said viewing face with relation to its support base.

5. An instrument case having a viewing face, a cover plate adapted to overlie said instrument face, means for supporting the cover plate on said case including a slotted bracket rigidly secured to one margin of said cover plate and extending into overlying relation with one side of said case, a pin carried by said case and extending through said slot, a manually rotatable member accommodated on said pin, enlarged apertures in said bracket adjacent opposite ends of said slot adapted to accommodate a reduced portion of said manually rotatable member, a compression spring acting between said pin and said manually rotatable member urging said member toward said bracket, an abutment carried by said pin, the inner margin of said reduced portion having a detent notch therein urged into engagement with said abutment by said compression spring, the coaction of said abutment and detent notch upon rotation of said member serving to cam said reduced portion thereof out of the appropriate one of said apertures to permit rectilinear movement of the cover plate with relation to the instrument case, said compression spring seating said reduced portion of the manually rotatable member in the other one of said apertures upon further rotation of said member at the termination of the rectilinear movement of said cover plate.

6. An instrument case having a viewing face, a cover plate adapted to overlie said instrument face, means for supporting the cover plate on said case, including a slotted bracket rigidly secured to one margin of said cover plate and extending into overlying relation with one side of said case, a pin carried by said case and extending through said slot, a manually rotatable member accommodated on said pin, enlarged apertures in said bracket adjacent opposite ends of said slot adapted to accommodate a reduced portion of said manually rotatable member, resilient means acting between said pin and said manually rotatable member urging said member toward said bracket, and cooperating cam means carried by said pin and said manually rotatable member whereby rotation of said member cams said reduced portion thereof out of the appropriate one of said apertures to permit rectilinear movement of the cover plate with relation to the instrument case, said resilient means seating said reduced portion of the manually rotatable member in the other one of said apertures upon further rotation of said member at the termination of the rectilinear movement of said cover plate.

7. An instrument case having a viewing face, a cover plate adapted to overlie said instrument face, means for supporting the cover plate on said case including a slotted bracket extending between said cover plate and one side of said case, a pin carried by said case and extending through said bracket slot, a manually rotatable member accommodated on said pin, an enlarged aperture in said bracket adjacent one end of said slot adapted to accommodate a portion of said manually rotatable member, resilient means acting between said pin and said manually rotatable member urging said member toward said bracket, and cooperating cam means carried by said pin and said manually rotatable member whereby rotation of said member cams said portion thereof out of said aperture to permit rectilinear movement of the cover plate with relation to the instrument case.

References Cited in the file of this patent
UNITED STATES PATENTS

| | | |
|---|---|---|
| 1,991,030 | Schimmel | Feb. 12, 1935 |
| 2,264,419 | Unger | Dec. 2, 1941 |